June 8, 1954  C. L. CALOSI  2,680,333
TOOL CHUCK FOR VIBRATING DEVICES
Filed March 16, 1951  2 Sheets-Sheet 1
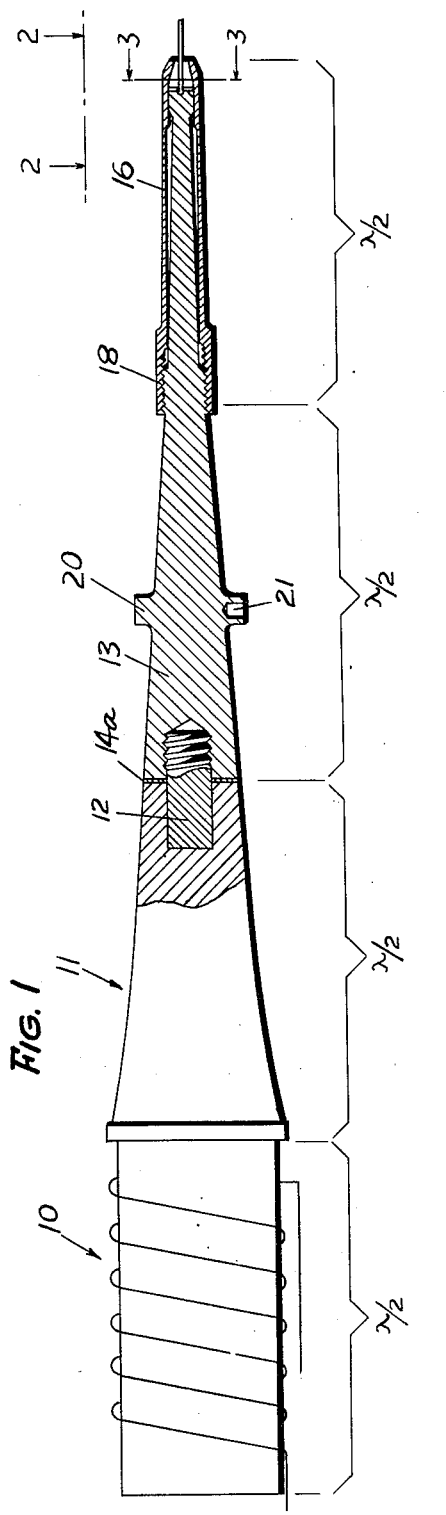
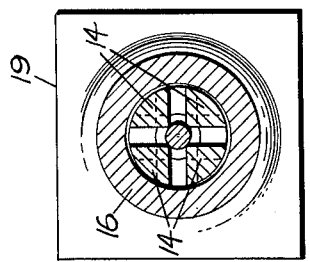
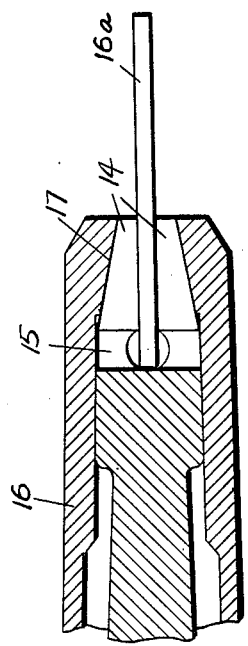
INVENTOR
CARLO L. CALOSI
BY Elmer J. Gorman
ATTORNEY June 8, 1954 C. L. CALOSI 2,680,333
TOOL CHUCK FOR VIBRATING DEVICES
Filed March 16, 1951 2 Sheets-Sheet 2
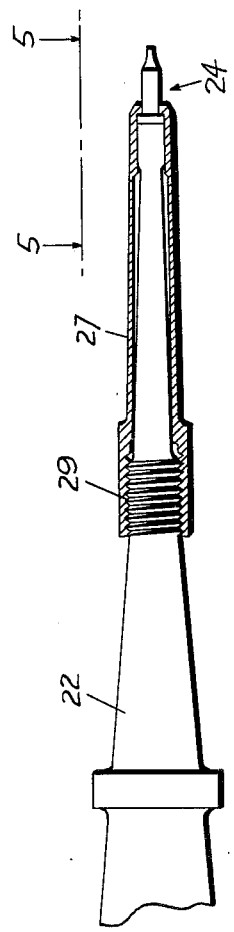
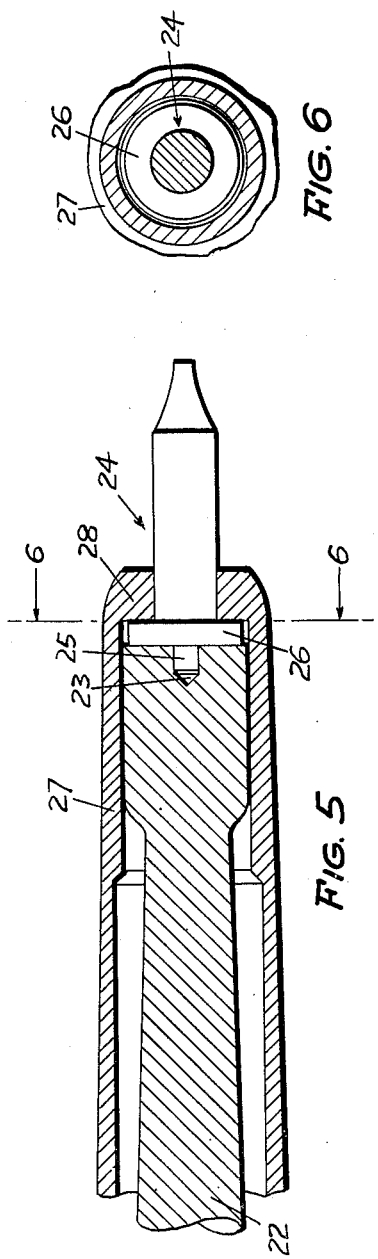
INVENTOR
CARLO L. CALOSI
BY Elmer J. Gorn
ATTORNEY Patented June 8, 1954

2,680,333

UNITED STATES PATENT OFFICE 2,680,333

TOOL CHUCK FOR VIBRATING DEVICES

Carlo L. Calosi, Cambridge, Mass., assignor to Raytheon Manufacturing Company, Newton, Mass., a corporation of Delaware Application March 16, 1951, Serial No. 216,061

14 Claims. (Cl. 51—59)

This invention relates to vibratory devices, and more particularly to a tool holder adapted for use with said vibratory devices.

In copending application, Serial No. 197,023, filed November 22, 1950, now abandoned, there is disclosed a vibratory device wherein a source of vibrations is connected to a tapered medium which increases the amplitude of said vibrations. In this device, the tool which transmits the vibrations to the work is rigidly and permanently attached, as by soldering, to a tool holder, said tool holder comprising part of the tapered medium and being joined to the remainder of the tapered medium by a threaded joint.

This invention discloses that the tool holder may have attached to the free end thereof a tool holding or clamping device which may be readily engaged or disengaged from a tool.

In one modification of the invention disclosed herein, the tool holder comprises a chuck made up of a plurality of fingers attached to the smaller end of the tapered tool holder, said fingers extending substantially parallel to each other, and each finger having one end attached to the tool holder and the other end extending outwardly from the tool holder. The free ends of the fingers are urged together by a cylindrical member which surrounds said fingers and has an inner tapered surface which engages mating tapered surfaces on the fingers such that, as the cylinder is moved axially along the tapered tool holder toward the larger end thereof, the fingers will be urged together. If a tool is inserted between the fingers and the outer cylindrical member is rigidly clamped axially along the tapered tool holder, the fingers will rigidly engage the tool. In a standard chuck, this outer cylindrical member may be rigidly held axially by means of threads adjacent the fingers such that as the cylindrical member is rotated on the threads it moves axially, thereby clamping the fingers together on the tool.

It has been discovered that, if the threaded portion of the outer cylindrical member engages the gradually tapered tool holder adjacent the fingers, the vibrations of the tool holder during operation of the device loosen this threaded joint, and, as a result, the tool is no longer clamped in the tool holder.

This invention discloses that, if the outer cylinder or clamping means is rigidly attached to the tapered tool holder at a point of an integral number of half wave lengths from the fingers, for example, by means of a thread, this joint will not loosen during operation of the device. It is believed that this occurs because the threaded joint being a half wave length from the tool is an antinode, and hence the stresses on the threaded joint are minimized to such an extent that the joint holds even though the acceleration and forces at the tool are extremely large.

Furthermore, since there is a node in the cylindrical member between the tool and the point of connection to the gradually tapered member, the cylindrical member has portions thereof accelerating at substantially equal magnitudes in opposite directions. Accordingly, the resultant acceleration for the overall cylindrical member is very low and, consequently, very little force need be transmitted through the threaded joint between said cylindrical member and the tapered member in order to produce substantially equal motions in adjacent portions of the tapered member and the cylindrical member. If the cylinder were threadedly joined to the tapered member near the fingers, the entire force, due to accelerations of the cylindrical member, would have to be borne by the threaded joint, thereby causing said joint to be repeatedly flexed and, consequently, loosened.

This invention further discloses that if the outer cylindrical member is made to resonate independently at the operating frequency of the device, and that if the outer cylinder has its cross-sectional area varied as it progresses along the axis thereof with the variation being substantially equal to the variation of the cross-sectional area in adjacent portions of the tapered member, then the end of the cylindrical member which engages the fingers will be moving axially in phase with the movement of the fingers themselves, and the amplitudes of movement of the fingers will be substantially the same as the amplitude of movement of the portion of the cylinder engaging the fingers. Hence, there will be little or no frictional rubbing between the fingers and the portion of the cylinder engaged thereby, and, accordingly, little or no wear of these parts.

In another modification of the invention disclosed herein, the tool holding fingers have been replaced by a simple centering hole in the end of the tapered member. A particular type of tool is used having a pin which fits into the hole in the tapered member and a flange which rigidly engages the end of the tapered member. The outer cylinder has a lip which engages the opposite side of the tool flange from that engaging the tapered member such that when the cylinder is tightened by the threaded joint the tool is rigidly held to the end of the tapered member.

This modification differs from the one first described in that the first modification provides fingers which frictionally engage the tool, while in the second modification the tool is rigidly and firmly engaged such that it is impossible for the tool to slip in the tool holder.

Other and further objects and advantages of this invention will become apparent as the description thereof progresses, reference being had to the accompanying drawings, wherein:

Fig. 1 illustrates a partially broken away longitudinal view of a vibratory device embodying this invention;

Fig. 2 illustrates a longitudinal, cross-sectional view of the tip of the tool holder illustrated in Fig. 1, taken along the line 2—2 of Fig. 1;

Fig. 3 illustrates a transverse, cross-sectional view of the device shown in Fig. 1, taken along line 3—3 of Fig. 1;

Fig. 4 illustrates another embodiment of the tool holder, and is adapted for use with the vibratory device illustrated in Fig. 1;

Fig. 5 illustrates a longitudinal, cross-sectional view of the tip of the tool holder shown in Fig. 4, taken along line 5—5 of Fig. 4; and Fig. 6 illustrates a transverse, cross-sectional view of the device shown in Fig. 5, taken along line 6—6 of Fig. 5.

Referring now to Figs. 1, 2 and 3, there is shown a source of vibrations 10 which may be any desired type as, for example, a magnetostrictive transducer. For a more complete description of a desirable embodiment of source 10, reference may be had to the aforementioned copending application. Rigidly attached to source 10 as, for example, by silver soldering, is a tapered member 11 which, as shown here, has a substantially circular cross section whose area decreases as member 11 extends away from source 10. Member 11 is substantially a half wave length long at the vibrational frequency of source 10, it being clearly understood that member 11 could be any desired integral number of half wave lengths long.

Embedded in the smaller end of member 11 is a stud 12, the exposed end of which is threaded. A tool holder comprising a tapered member 13 is threadedly attached to stud 12. A washer 14a is placed between the adjoining faces of members 11 and 13 to provide for firm seating of said faces and to prevent abrasion therebetween. Preferably, washer 14a is of the material which is softer than the materials of members 11 and 13. For example, if members 11 and 13 are nickel or Monel metal, washer 14a may be made of soft copper.

As shown here, tapered member 13 extends away from the juncture of member 11 for a distance substantially equal to two half wave lengths of the vibrational frequency of source 10, the cross-sectional area of member 13 gradually decreasing, for example, as an exponential function of distance along the length thereof. The smaller or unattached end of member 13 terminates in a plurality of fingers 14, fingers 14 being made here, by way of example, integral with tapered member 13. As shown here, by way of example, there are four fingers 14 made by cutting a pair of crossed slots in the small end of the tapered member 13. Holes 15 are drilled along the bottoms of the slots to prevent fracturing of the material, due to high stress concentrations.

As shown here, a tool comprising a rod 16a is positioned between fingers 14 and extends outwardly beyond the end of fingers 14. Fingers 14 are urged together by means of a cylindrical member 16 which surrounds fingers 14. The inner surface of the portion of cylinder 16 engaging fingers 14 has a tapered contour, as at 17, and engages mating tapered contours on fingers 14 such that, as the cylinder 16 is moved axially toward the larger end of tapered member 13, fingers 14 will be urged together. Cylinder 16 extends along tapered member 13 coaxial therewith but spaced therefrom for a distance substantially equal to an integral number of half wave lengths from the point of engagement of cylinder 16 with fingers 14. At this point, cylinder 16 threadedly engages tapered member 13 as, for example, at 18, the outer surface of cylinder 16 being formed at this point into a square, as at 19, to provide for the application of a wrench to cylinder 16 to firmly secure cylinder 16 to member 13 by tightening the threads at 18. It may be noted that the cross-sectional area of cylinder 16 is tapered such that it decreases as it extends from the threads 18 to the point of engagement with the fingers 14, the dimensions and contour of cylinder 16 being shaped to produce the same amplitude increase as the tapered member 13. It should clearly be understood that the member 13 and the cylinder 16 may be any desired integral number of half wave lengths long.

At a point substantially a quarter wave length from the junction of members 11 and 13, there is provided a raised portion 20 having a hole 21 therein adapted to take a spanner wrench for the purpose of tightening the joint between members 11 and 13.

Referring now to Figs. 4, 5 and 6, there is shown another modification of a tool holder useful with the vibratory device illustrated in Fig. 1. There is shown a tapered member 22 substantially similar to tapered member 13 of Figs. 1 through 3, tapered member 22 being adapted to engage member 11 in place of member 13. The smaller end of member 22, instead of terminating in fingers, has a hole 23 drilled therein coaxial therewith. A tool 24 has a pin 25 adapted to fit in hole 23. A flange 26 of the tool 24 engages the end of member 22. A cylindrical member 27 is provided substantially similar to cylindrical member 16 of Figs. 1 through 3. However, member 27 has a lip 28 in place of the tapered surface 17 of member 16. Lip 28 engages the opposite side of the flange 16 from that engaging the tapered member 22. The tool 24 may have any desired contour of the cutting edge, and is made integral with the flange 26 and pin 25 thereof such that, when cylinder 27 threadedly engages the member 22, as at 29, a half wave length away from tool 24, the lip 28 on member 27 will firmly urge flange 26 against the end of member 22, thereby rigidly holding the tool 24.

This completes the description of the embodiments of the invention illustrated herein. However, many modifications thereof will be apparent to persons skilled in the art without departing from the spirit and scope of this invention. For example, the shape of the contour of the tool held by the tool holder, as well as the tool holder itself, may be varied to produce any desired shape of tool or cutting surface.

Furthermore, this invention is not necessarily limited to structures using compressional waves, but could be used in tool holding devices employing transverse, flexural resonance such as a cantilever bar vibrating in one of its higher harmonic modes with the tool clamping means at an end thereof, and the securing threaded joint positioned substantially in a region of inflection spaced from said end. Accordingly, it is desired that this invention be not limited to the particular details described herein, except as defined by the appended claims.

What is claimed is:

1. A vibratory device comprising an elongated body adapted to resonate at the desired operating frequency of said device, tool receiving means positioned at one end of said body, and clamping means adapted to rigidly clamp a tool in said tool receiving means, said clamping means being rigidly coupled to said body at a point substantially an integral number of half wave lengths of said frequency from said tool receiving means.

2. A vibratory device comprising a source of vibrations, a gradually tapered body connected to said source, tool receiving means positioned at one end of said body, and tubular clamping means surrounding said tool receiving means and adapted to rigidly clamp a tool in said tool receiving means, said clamping means being rigidly coupled to said body at a point substantially an integral number of half wave lengths from said tool receiving means at the operating frequency of said said source.

3. A vibratory device comprising a source of ultrasonic vibrations, a gradually tapered body connected to said source, tool receiving means positioned at the smaller end of said body, and clamping means adapted to rigidly clamp a tool in said tool receiving means, said clamping means being rigidly coupled to said body at a point substantially an integral number of half wave lengths from said tool receiving means.

4. A vibratory device comprising an elongated body adapted to resonate at the desired operating frequency of said device, a plurality of fingers attached to said body, and clamping means adapted to urge said fingers together, said clamping means being rigidly coupled to said body at a point substantially an integral number of half wave lengths of said frequency from said fingers.

5. A vibratory device comprising an elongated body adapted to resonate at the desired operating frequency of said device, tool receiving means attached to said body, and clamping means adapted to rigidly clamp a tool in said tool receiving means, said clamping means being adapted to resonate at substantially the operating frequency of said device.

6. A vibratory device comprising a source of vibrations, an elongated body connected to said source, tool receiving means attached to said body, and clamping means for rigidly clamping a tool in said tool receiving means, said clamping means being adapted to resonate at substantially the operating frequency of said source.

7. A vibratory device comprising a source of vibrations of a predetermined frequency, an elongated body connected to said source, a plurality of fingers attached to said body, and clamping means adapted to urge said fingers together, said clamping means being adapted to resonate at substantially the frequency of said source.

8. A vibratory device comprising a source of vibrations, an elongated body connected to said source, a plurality of fingers attached to said body, and clamping means adapted to urge said fingers together, said clamping means being adapted to resonate at substantially the operating frequency of said device and being rigidly coupled to said body at a point substantially an integral number of half wave lengths from said fingers.

9. A vibratory device comprising an elongated body, and means for clamping a tool to said body, said clamping means comprising a tubular member surrounding said body having a lip adapted to engage a tool, said member being rigidly attached to said body at a point substantially an integral number of half wave lengths away from said lip at the operating frequency of said device.

10. A vibratory device comprising an elongated body, and means for clamping a tool to said body, said clamping means comprising a member having a lip adapted to engage a flanged tool, said member being rigidly attached to said body at a point substantially an integral number of half wave lengths away from said lip at the operating frequency of said device.

11. A vibratory device comprising a source of vibrations an elongated body coupled to said source, and means for clamping a tool to said body, said clamping means comprising a member resonant at the frequency of said source and having a lip adapted to engage a tool, said member being rigidly attached to said body at a point substantially an integral number of half wave lengths away from said lip at the frequency of said source.

12. A vibratory device comprising a gradually tapered body, tool receiving means positioned at one end of said body, and clamping means adapted to rigidly clamp a tool in said tool receiving means, said clamping means being rigidly coupled to said body at a point substantially an integral number of half wave lengths from said tool receiving means and being tapered at substantially the same rate as said body.

13. A vibratory device comprising a gradually tapered body, a plurality of fingers attached to said body, and clamping means adapted to urge said fingers together, said clamping means being rigidly coupled to said body at a point substantially an integral number of half wave lengths from said fingers, said clamping means being adapted to resonate at substantially the operating frequency of said device and being tapered at substantially the same rate as said body.

14. A vibratory device comprising a gradually tapered body, and means for clamping a tool to said body, said clamping means comprising a member having a lip adapted to engage a flanged tool, said member being rigidly attached to said body at a point substantially an integral number of half wave lengths away from said lip at the operating frequency of said device and being tapered at substantially the same rate as said body.

References Cited in the file of this patent
UNITED STATES PATENTS

| Number | Name | Date |
|---|---|---|
| 204,416 | Backus | June 4, 1878 |
| 847,790 | Larsen | Mar. 19, 1907 |
| 2,452,211 | Rosenthal | Oct. 26, 1948 |
| 2,514,080 | Mason | July 4, 1950 |